United States Patent
Kawata

(10) Patent No.: US 6,184,165 B1
(45) Date of Patent: Feb. 6, 2001

(54) DIELECTRIC PORCELAIN COMPOSITION

(75) Inventor: Tomoaki Kawata, Tokyo (JP)

(73) Assignee: TDK Corporation, Tokyo (JP)

(*) Notice: Under 35 U.S.C. 154(b), the term of this patent shall be extended for 0 days.

(21) Appl. No.: 09/353,796

(22) Filed: Jul. 15, 1999

(30) Foreign Application Priority Data

Jul. 15, 1998 (JP) .................................................. 10-200244

(51) Int. Cl.$^7$ .................................................. C04B 35/468
(52) U.S. Cl. .............................. 501/32; 501/138; 501/139
(58) Field of Search ................................ 501/32, 138, 139

(56) References Cited

U.S. PATENT DOCUMENTS 6,107,228 * 8/2000 Sugimoto et al. .................... 501/139

FOREIGN PATENT DOCUMENTS

| 3-295856 | 12/1991 | (JP) . |
|---|---|---|
| 5-97508 | 4/1993 | (JP) . |
| 5-234420 | 9/1993 | (JP) . |
| 5-319920 | 12/1993 | (JP) . |
| 5-319921 | 12/1993 | (JP) . |
| 5-319922 | 12/1993 | (JP) . |
| 6-116021 | 4/1994 | (JP) . |
| 6-116022 | 4/1994 | (JP) . |
| 6-211564 | 8/1994 | (JP) . |
| 6-223625 | 8/1994 | (JP) . |
| 8-167322 | 6/1996 | (JP) . |
| 8-167323 | 6/1996 | (JP) . |
| 8-167324 | 6/1996 | (JP) . |
| 8-208328 | 8/1996 | (JP) . |
| 8-208329 | 8/1996 | (JP) . |
| 8-245262 | 9/1996 | (JP) . |

OTHER PUBLICATIONS

Patent Abstracts of Japan, vol. 1997, No. 07, Jul. 31, 1997, JP 09 071462, (Mar. 18, 1997).
Patent Abstracts of Japan, vol. 1996, No. 07, Jul. 31, 1996, JP 08059344, (Mar. 5, 1996).

* cited by examiner

*Primary Examiner*—David Brunsman
(74) *Attorney, Agent, or Firm*—Oblon, Spivak, McClelland, Maier & Neustadt, P.C.

(57) ABSTRACT

A dielectric porcelain composition according to the present invention is composed of a main component expressed in a general formula of $xBaO \cdot y((1-t)Nd_2O_3 \cdot tSm_2O_3) \cdot zTiO_2$, where $6 \leq x \leq 23$, $13 \leq y \leq 30$, $64 \leq z \leq 68$, $0 \leq t < 1$ and $x+y+z=100$. The main component contains a sub component containing Cu oxide in the range of 0.1 to 3.0 wt % in terms of CuO and glass composition in the range of 2.0 to 10 wt %. Further, 90 wt % or more of the glass composition is at least one selected from $SiO_2$, $B_2O_3$, MgO, BaO, SrO, ZnO and CaO, in the ranges of: 5 wt % $\leq SiO_2 \leq$ 15 wt %; 15 wt % $\leq B_2O_3 \leq$ 25 wt %; 50 wt % $\leq$ (MgO+BaO+SrO+ZnO+CaO) $\leq$ 80 wt %; 90 wt % $\leq$ ($SiO_2+B_2O_3$+MgO+BaO+SrO+ZnO+CaO) $\leq$ 100 wt %.

3 Claims, 1 Drawing Sheet

DIELECTRIC PORCELAIN COMPOSITION

BACKGROUND OF THE INVENTION

1. Field of the Invention

The present invention relates to a dielectric porcelain composition mainly containing $BaO \cdot Nd_2O_3 \cdot TiO_2$ having a sintering property at low temperature, enabling to use Ag, Cu or an alloy containing a main component of Ag or Cu as an internal conductor.

2. Description of the Related Art

Recently, mobile communication technologies such as car telephones, cellular phone and the like have been considerably developing. In the mobile communication, high frequency zone called as quasi microwaves of several hundred MHz to several GHz. Therefore, high frequency characteristics are made great account of also in electronic devices as resonators, filters or capacitors to be used in the mobile communication instruments. Concerning the recent popularization of the mobile communication, miniaturization and low price of the communicating instruments are important factors in addition to improvement of services. Accordingly, they are also demanded in regard to high frequency devices.

For example, in materials for the resonator, the following characteristics are required for the using frequency to improve and miniaturize characteristics of the high frequency characteristics.

(1) Specific dielectric constant is large: The resonator to be used nearly the microwave often utilizes that the wave length is shortened in a dielectric substance in proportion to the inverse number of a square root of dielectric constant. Accordingly, the length of the resonator can shorten the wavelength in proportion to the reverse number of the square root of the dielectric constant.

(2) Q is large: For the materials of the microwave, Q to be defined with $Q=1/\tan \delta$ is used as valuation of dielectric loss, and that Q is large means the loss is small.

(3) Temperature change of the dielectric constant is small: The temperature change of the resonance frequency of the resonator or the filter is controlled to the utmost. Therefore, it is desirable that the temperature change of the dielectric constant is small.

(4) The sintering at low temperature is possible: It has recently been required to miniaturize electronic devices accompanying with miniaturization of the mobile communication instruments. Therefore, for realizing the miniaturization of devices, parts of surface mount devices (SMD) holding conductive electrodes within interiors thereof are changing to main streams. In this case, it is desirable to use Ag or Cu being low resistance as conductive electrodes for improving the loss characteristics of the device. However, since Ag or Cu has low melting points, it is required that the dielectric porcelain may be burned at temperature lower than their melting points. The matter of this concurrent burning is also pointed out when Ag or Cu is made capacitor materials for temperature compensation.

As the dielectric materials for the microwave, compositions as $BaO \cdot 4TiO_2$ group or $BaO \cdot$ rare earth oxide$\cdot TiO_2$ group are known. In particular, as $BaO \cdot Nd_2O_3 \cdot TiO_2$ group is high in the dielectric constant and the Q value, comprehensive studies have been made thereon. Recently, the sintering at low temperature has been carried out in these compositions, and is described in JP-A-3-295856, JP-A-5-97508, JP-A-6-223625, JP-A-6-211564, JP-A-5-234420, JP-A-5-319921, JP-A-5-319920, JP-A-6-116021, JP-A-6-116022, JP-A-8-167322, JP-A-8-167323, JP-A-8-208329, JP-A-8-167324, JP-A-8-208328, JP-A-5-319922, or JP-A-8-245262. (JP-A means "Unexamined Japanese Patent Publication (kokai)")

In these technologies, $BaO \cdot$ rare earth oxide$\cdot TiO_2$ are used as a main component to which glass composition or glass composition and several kinds of sub component are added for carrying out the sintering at low temperature.

However, almost all of them contain PbO or $Bi_2O_3$ in the main component or additives. Since PbO and $Bi_2O_3$ also have promoting effects of the sintering at low temperature in addition to improvement of the characteristics such as increasing the dielectric constant, effects of both are utilized for practicing as the materials sintered at low temperature for high frequency.

As described above, the dielectric porcelain of $BaO \cdot Nd_2O_3 \cdot TiO_2$ group is high in the dielectric constant and Q, and small in temperature coefficient of the dielectric constant. It is utilized for dielectric substance for microwave. The sintering at low temperature has recently been realized in $BaO \cdot Nd_2O_3 \cdot TiO_2$ group, and PbO and $Bi_2O_3$ are added for increasing the characteristics and promoting the sintering at low temperature. There are very scarcely inventions without both of PbO and $Bi_2O_3$.

Environmental protection campaign of a global scale has further been raised. Therefore, also in the fields of electronic parts, it is expected to reduce environmental contaminating substances as PbO, $Bi_2O_3$ and others. When substances contain environmental contamination, treating facilities of waste liquid or special equipment are necessary in manufacturing processes, and also in view of production cost, it is desirous not to contain such contaminating substances. Further, PbO, and $Bi_2O_3$ are easily evaporated at high temperature, and ready for dispersing factors, and yet being neither PbO nor $Bi_2O_3$ is desired.

SUMMARY OF THE INVENTION

It is an object of the invention to provide a composition of dielectric porcelain for microwave, which is sintered at low temperature, containing no environmental contaminating substances such as PbO, $Bi_2O_3$ and others.

According to the present invention, a dielectric porcelain composition comprises a main component expressed in a general formula of $xBaO \cdot y((1-t)Nd_2O_3 \cdot tSm_2O_3) \cdot zTiO_2$; where $6 \leq x \leq 23$, $13 \leq y \leq 30$, $64 \leq z \leq 68$, $0 \leq t < 1$ and $x+y+z=100$; said main component containing a sub component comprising Cu oxide in the range of 0.1 to 3.0 wt % in terms of CuO and glass composition in the range of 2.0 to 10 wt %; wherein 90 wt % or more of said glass composition is at least one selected from $SiO_2$, $B_2O_3$, MgO, BaO, SrO, ZnO and CaO, and said glass composition satisfies the conditions of: 5 wt % $\leq SiO_2 \leq$ 15 wt %; 15 wt % $\leq B_2O_3 \leq$ 25wt %; 50 wt % $\leq$(MgO+BaO+SrO+ZnO+CaO)$\leq$ 80 wt %; 90 wt % $\leq$(SiO$_2$+B$_2$O$_3$+MgO+BaO+SrO+Zno+CaO)$\leq$ 100 wt %.

DETAILED DESCRIPTION OF THE INVENTION

Figure 1:
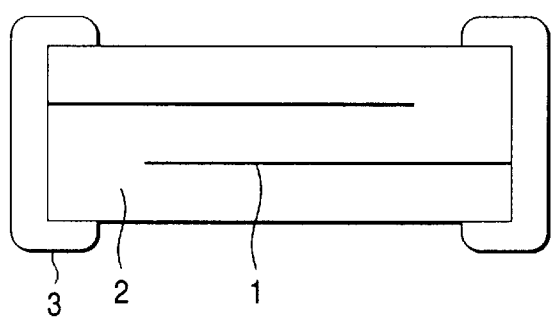
FIG. 1 is a view schematically showing the chip capacitor.

The present invention will be described as follows in detail.

In the present invention, dielectric porcelain of $BaO\cdot Nd_2O_3\cdot TiO_2$ group contains CuO and glass composition. Accordingly, it is possible to provide a dielectric porcelain composition which can be sintered at temperature below melting point of Ag, Cu or an alloy of Ag or Cu while keeping the dielectric characteristics to the utmost. The present inventors have been found out the excellent dielectric porcelain having the following condition.

The dielectric porcelain composition according to the present invention is composed of a main component expressed in a general formula of $xBaO\cdot y((1-t)Nd_2O_3\cdot tSm_2O_3)\cdot zTiO_2$, where $6 \leq x \leq 23$, $13 \leq y \leq 30$, $64 \leq z \leq 68$, $0 \leq t < 1$ and $x+y+z=100$. Further, the main component contains a sub component containing Cu oxide in the range of 0.1 to 3.0 wt % (preferably, 0.5 to 1.5 wt %, and more preferably, 0.8 to 1.2 wt %) in terms of CuO and glass composition in the range of 2.0 to 10 wt % (preferably, 3.0 to 6.0 wt %). Provided that 90 wt % or more of the glass composition is at least one selected from $SiO_2$, $B_2O_3$, MgO, BaO, SrO, ZnO and CaO, in the ranges of: 5 wt % $\leq SiO_2 \leq$ 15 wt %; 15 wt % $\leq B_2O_3 \leq$ 25 wt %; 50 wt % $\leq$ (MgO+BaO+SrO+ZnO+CaO) $\leq$ 80 wt %; 90 wt % $\leq$ ($SiO_2+B_2O_3$+MgO +BaO+SrO+ZnO+CaO) $\leq$ 100 wt %. In this case, preferably, 70 wt % $\leq$ (MgO+BaO+SrO+ZnO+CaO) $\leq$ 80 wt %; 95 wt % $\leq$ ($SiO_2+B_2O_3$+MgO+BaO+SrO+ZnO+CaO) $\leq$ 100 wt %.

Explanation will be made to the dielectric characteristic aimed at by the invention.

The valuations of the dielectric characteristic were carried out with respect to the sintering property at low temperature, the specific dielectric constant, the temperature coefficient of the dielectric constant (hereafter called as "TCC") and the Q characteristic. At first, concerning the low temperature sintering property, the present invention is to provide the dielectric porcelain composition sintered at low temperature to be used to the electronic devices where Ag or Cu is an internal conductor. Therefore, the lowering of the low temperature sintering property is fatal, and this is a most important characteristic. Actually, it is judged that those having the density of the sintered body of 5.0 g/cm³ or more after having been burned at temperature of 920° C. are practically available.

Next, concerning the specific dielectric constant, when the composition according to the present invention is used to the resonator of the dielectric substance for the high frequency, since the length of the resonator depends on the magnitude of the dielectric constant, it is advantageous that the dielectric constant is large for miniaturizing the resonator. The dielectric porcelain composition of the invention is considered to provide various electronic devices where Ag or Cu is an internal conductor. Therefore, since preferable values of the dielectric constant cannot be instantly determined, the present invention does not especially take up the values of the dielectric constant as a matter.

The temperature coefficient (TCC) of the dielectric constant is calculated in the following formula (1) in the present study.

$$\text{TCC}(\text{ppm}/°C.)=(C_{85° C.}-C_{-25° C.})/C_{25° C.}\times 1/110\times 1{,}000{,}000 \quad (1)$$

where TCC: temperature coefficient of the dielectric constant of −25° C. to 85° C.; $C_{85° C.}$: Capacitance at 85°; $C_{25° C.}$: Capacitance at 25° C.; and $C_{-25° C.}$: Capacitance at −25°.

When the present invention is used to the resonator of the dielectric constant, it is preferable that TCC is within ±30 ppm/°C. When the present invention is used to the dielectric filter, it is preferable that TCC is within ±100 ppm/° C. In addition, the present invention may be utilized as a capacitor for temperature compensation other than the dielectric filter. In this case, TCC widens the application field by having comprehensive values. From these matters, it is preferable that a target of TCC is set near 0 (zero), but there is no problem if the absolute value of TCC is large.

Finally, concerning the Q characteristic, as mentioned, the present invention is to provide the electronic device which Ag or Cu is the internal conductor. Accordingly, as the lowering of the Q characteristic means a large loss of the electronic device, the Q characteristic larger than a certain extent is necessary. Accordingly, in the present invention, it is determined that the target of the Q characteristic to be 1000 or more.

Further explanation will be made to reasons for defining the range of the dielectric porcelain composition.

The composition of the main component gives large influences to the dielectric characteristics of the dielectric constant, $Q(=1/\tan \delta)$, TCC and the low temperature sintering property. If BaO is 6 mol % or less, the dielectric constant lowers, and the sintering property also lowers. Since the lowering of the sintering property is fatal in regard to the object of the invention which is to provide the electronic device where Ag or Cu is the internal conductor, the amount of BaO is limited to a range enabling to secure the sintering property at low temperature. If it increases over 23 mol %, the dielectric constant is large and the sintering property heightens, but TCC largely shifts toward a minus side as well as the Q characteristic lowers. When the Q characteristic lowers, since loss of the electronic device to be provided is large and not practical, the amount of BaO is limited to a range enabling to secure the Q characteristic.

If $Nd_2O_3$ or the combination of $Nd_2O_3$ and $Sm_2O_3$ exceed 30 mol %, the dielectric constant lowers as well as the sintering property lowers. Thus, $Nd_2O_3$ is limited to a range enabling to secure the sintering property. If it is less than 13 mol %, the dielectric constant increases and the sintering property heightens, but TCC and the Q characteristic are deteriorated. Therefore, the amount of $Nd_2O_3$ is limited to a range not deteriorating the Q characteristic.

Depending on the content of $Sm_2O_3$, TCC may be improved as maintaining other characteristics.

If $TiO_2$ is less than 64 mol %, TCC largely shifts toward a plus side as well as the Q characteristic lowers. $TiO_2$ is limited to a range not deteriorating the Q characteristic. If it exceeds 68 mol %, the sintering property lowers as well as TCC largely shifts toward the minus side. Therefore, the amount of $TiO_2$ is limited to a range enabling to secure the sintering property.

For such reasons, the composition of the main component is defined.

Ranges of the composition of the sub component will be explained. Concerning the amount of CuO, if it is less than 0.1 wt % with respect to 100 weight parts of the main component, the sintering effect by cuO is insufficient. Therefore, the amount of CuO is limited to a range to enabling to secure the sintering property. When the amount of cuo exceeds 3.0 wt %, the Q characteristic lowers as well as TCC is made nonlinear. Thus, the amount of CuO is defined in a range not deteriorating the Q characteristic. The limiting range is 0.1 to 3.0 wt %.

Concerning the amount of the glass composition, if it is less than 2.0 wt % with respect to the main component, the low temperature sintering effect is insufficient. When the amount of the glass exceeds 10.0 wt %, the dielectric constant lowers as well as the Q characteristic deteriorates. The glass amount is limited in a range of 2.0 to 10.0 wt % enabling to secure the low temperature sintering property and the Q characteristic.

Concerning the glass composition, when $SiO_2$ is 15 wt % or more, or $B_2O_3$ is less than 15 wt %, the sintering promotion effect is insufficient. When $SiO_2$ is less than 5 wt %, or $B_2O_3$ exceeds 25 wt %, vitrification is difficult and not practical It is desirable the glass composition is composed of any of $SiO_2$, $B_2O_3$, MgO, BaO, SrO, ZnO and CaO. For example, in case of other inorganic elements as $Al_2O_3$, the sintering promotion effect is lowered, and the amounts of other inorganic elements should be less than 10 wt %. For such reasons, the limiting ranges of the sub component are determined. Further, Ag can be added as a subcomponent. By adding Ag in the dielectric element, when Ag or Ag alloy is used as an inner conductor, it is possible to compress to disperse Ag from the inner electrode to the dielectric material. Incidentally, it is preferable that the content of Ag is in the range of 0.3 to 1.5 wt % with respect to the total amount of the main component.

Still further explanation will be made to the method for producing the dielectric composition.

At first, oxides of barium, neodymium and titanium as main component and oxide of samarium if required are prepared. With respect to raw materials, oxides are not necessarily required, for example, when employing substances which turn out oxides by a heat treatment such as carbonate, hydroxide, sulfide and others, it is possible to obtain the dielectric porcelain composition equivalent to a case of using the oxides. These raw materials are weighed to be predetermined amounts, mixed and calcined.

The mixing may depend on a wet mixture using water for 4 to 24 hours. The temporary burning plays role of composing compounds from the mixture of raw materials as the main component (BaO·rare earth oxide·$TiO_2$), preferably at temperature of 1100 to 1350° C. for 1 to 24 hours.

CuO and glass powder as the sub component of the fixed amounts are weighed with respect to the calcined main component, and mixed and pulverized together with the main component. The mixing and pulverizing also may depend on the wet mixture of the water. More preferably, this mixture is once again burned at temperature lower than the temporary burning for example, 650 to 850° C. for 1 to 10 hours, and it is better to grind such burned powders to desired diameter and use them. It is possible to uniformly disperse the main component and the sub component by once again calcining, to obtain powders of less dispersion range, and accordingly to heighten working effectiveness as a molding in a later process.

The obtained powder is mixed with an organic binder as polyvinyl alcoholic, acrylic or ethylcellulose groups, and then molded into a desired shape, followed burning. The molding may depend on a wet molding of a sheet method or a printing method, or a dry molding of a press shaping. In view of desired shapes, the molding methods may be selected. The burning is preferably performed in an oxidizing atmosphere, for example, as an air, and the burning temperature is suitable at around 850 to 1100° C. for 1 to 24 hours.

Consequently, it is possible to carry out the low temperature burning lower than the melting point of Ag, Cu or the alloy of Ag or Cu, and to compose electronic parts where these metals are internal conductors, As a result, it is possible to improve, miniaturize and make low costs of various characteristics of the devices for high frequency. Besides, by containing Cu, it is possible to reduce the glass amount than conventionally, thus contributing to the low costs in addition to the improvement of the dielectric characteristic.

Furthermore, since the composition according to the present invention does not include any environmental contaminating substances such as PbO, $Bi_2O_3$ and the like, devices suited to parts of the recent environment protection may be provided, and any especial equipment for treating waste liquids is not required, thereby making for the low cost. PbO and $Bi_2O_3$ are easily evaporated at high temperature, and as the present invention does not contain these evaporating substances, it is possible to provide the dielectric porcelain composition effective in removing instability in the manufacturing process.

EXAMPLES

The present invention will be practically explained in the following examples.

Example 1

$BaCO_3$, $Nd(OH)_3$ and $TiO_2$ were used as starting materials, weighed such that the mixing ratios of BaO, $Nd_2O_3$ and $TiO_2$ after burning were as shown in Table 1, added with pure water to be 30% concentration of a slurry, wet-mixed in a ball mill for 16 hours, and then dried. Subsequently, the dried powder was calcined in the air at temperature of 1250° C. for 2 hours. The calcined powder, the powder of glass kind A in Table 2, and CuO were weighed as shown in Table 1, added with the pure water to be 33% concentration of the slurry, and wet-pulverized in the ball mill for 24 hours, followed by drying to turn out the dielectric powder.

TABLE 1

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | $Nd_2O_3$ | $Sm_2O_3$ | $TiO_2$ | Glass kinds | Glass contents | CuO contents | | Sintered density | ε | Q | TCC | |
| 1 | * | 18.5 | 15.4 | 0 | 66.1 | | 0 | 0 | 1300° C. | | | | | Influences of |
| 2 | | 18.5 | 15.4 | 0 | 66.1 | A | 2 | 1 | 920° C. | 5.1 | 89 | 4800 | −160 | sintered |
| 3 | | 18.5 | 15.4 | 0 | 66.1 | A | 3 | 1 | 920° C. | 5.4 | 84 | 4640 | −42 | assistants |
| 4 | | 18.5 | 15.4 | 0 | 66.1 | A | 5 | 1 | 920° C. | 5.3 | 82 | 3810 | −39 | |
| 5 | | 18.5 | 15.4 | 0 | 66.1 | A | 5 | 0.1 | 920° C. | 5.3 | 84 | 4940 | −43 | |
| 6 | | 18.5 | 15.4 | 0 | 66.1 | A | 5 | 0.5 | 920° C. | 5.4 | 84 | 4220 | −47 | |

TABLE 1-continued

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | Nd$_2$O$_3$ | Sm$_2$O$_3$ | TiO$_2$ | Glass kinds | Glass contents | CuO contents | | Sintered density | $\epsilon$ | Q | TCC | |
| 7 | * | 18.5 | 15.4 | 0 | 66.1 | A | 1 | 1 | 920° C. | 4.8 | 91 | 2000 | −250 | |
| 8 | | 18.5 | 15.4 | 0 | 66.1 | A | 10 | 1 | 920° C. | 5.3 | 60 | 2000 | −105 | |
| 9 | * | 18.5 | 15.4 | 0 | 66.1 | A | 15 | 1 | 920° C. | 5.3 | 48 | 980 | −150 | |
| 10 | * | 18.5 | 15.4 | 0 | 66.1 | A | 5 | 0.05 | 920° C. | 4.9 | 84 | 3000 | −42 | |
| 11 | | 18.5 | 15.4 | 0 | 66.1 | A | 5 | 3 | 920° C. | 5.3 | 79 | 1000 | 100 | |
| 12 | * | 18.5 | 15.4 | 0 | 66.1 | A | 5 | 5 | 920° C. | 5.3 | 82 | 120 | 120 | |

TABLE 2

| Glass kinds | Comparative examples | SiO$_2$ | B$_2$O$_3$ | MgO | CaO | BaO | SrO | ZnO | Sub total | Total | Al$_2$O$_3$ |
|---|---|---|---|---|---|---|---|---|---|---|---|
| A | | 9 | 22 | | | 9 | | 58 | 67 | 98 | |
| B | | 11 | 22 | | | | | 58 | 58 | 92 | |
| C | | 15 | 22 | 5 | | 56 | | | 61 | 98 | |
| D | | 11 | 21 | | | | | 58 | 58 | 90 | |
| E | | 11 | 22 | | 9 | | | 57 | 66 | 99 | |
| F | | 11 | 22 | | | | 9 | 56 | 65 | 98 | |
| G | | 15 | 25 | 43 | | 13 | | | 55 | 96 | 2 |
| H | * | 14 | 22 | 38 | | 6 | | | 44 | 79 | 15 |
| I | * | 40 | 4 | | | 46 | | | 46 | 90 | 10 |
| J | * | 53 | 7 | | 22 | | | | 22 | 82 | 14 |
| K | * | 76 | 20 | | | | | | 0 | 96 | 1 |
| L | * | 64 | 18 | | | 3 | | | 3 | 85 | 6 |

To 100 weight parts of the obtained dielectric powder, 6.0 weight part of ethylcellulose as a binder and 90 weight parts of terpineol as a solvent were added, mixed, and dispersed by 3 rollers mill, and the dielectric paste was prepared. The dielectric paste and the Ag paste were alternately laminated by a screen process printing method, and cut into green chips of 4.5 mm×3.2 mm. The green chips were burned in the air for 2 hours, and burned with Ag as the external electrodes so as to make chip capacitors. The sintering property at low temperature was confirmed with the concentration after having been sintered. The dielectric characteristics of the materials were valued with the dielectric constant of the obtained chip capacitors, Q(=1/tan δ) and TCC (temperature coefficients of the dielectric constants from −25° C. to 85° C.).

Figure 2:
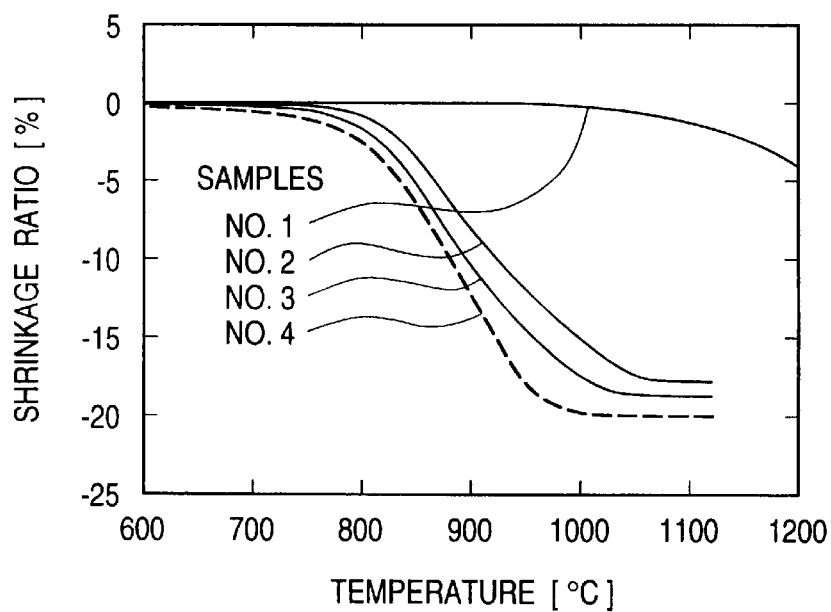
FIG. 2 is a view of measuring TMA by the glass amount.
Figure 3:
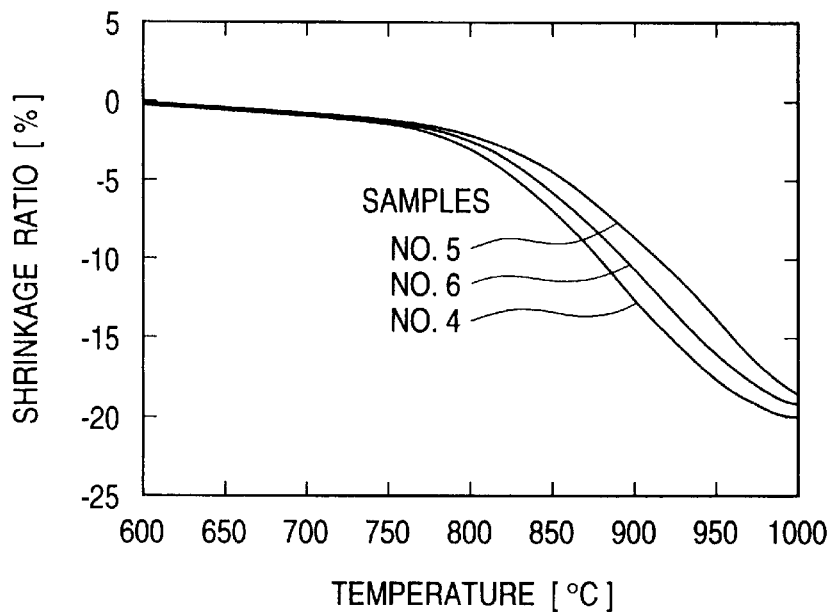
FIG. 3 is a view of measuring TMA by the CuO amount.

A cross sectional view of the chip capacitor is shown in FIG. 1. In the drawing, reference numeral 1 designates an internal electrode; 2, the dielectric element, and 3, a terminal electrode of Ag. The obtained dielectric characteristics are shown in Table 1. In Table 1, the sintered density has a unit of (g/cm$^3$), ∈ and Q have unit of dimensionless, and TCC has a unit of (ppm/° C.). FIGS. 2 and 3 show measured results of heat shrinking behaviors by using the green chips.

FIG. 2 shows measured results of TMA (Thermal Mechanical Analysis) by the glass amount, where an axis of abscissa shows temperature and an axis of ordinate shows shrinkage ratio. The measuring was made at heating ratio of 10° C./min. It is seen from FIG. 2 that Sample No. 1 shows the shrinkage percent of near zero, and the sintering did not appear until 1200° C., while Samples Nos. 2 to 4 show fixed shrinkage, from which is seen that the sintering was minute.

FIG. 3 shows measured results of TMA by the amount of CuO where the axis of abscissa shows temperature and the axis of ordinate shows the shrinkage percent. The measuring was made at heating ratio of 10° C./min. It is seen that each of them is the good sintered condition. The materials of each Table were held at the described temperatures for 2 hours.

From FIGS. 2 and 3, it is seen that the sintered characteristics are improved by containing the glass powder and CuO, and the sintering was accomplished at temperature below the melting point of Ag (960° C. or less). From Table 1, the dielectric characteristics when containing the glass powder and CuO in the composition are practically sufficient.

When the amount of CuO is less than 0.1 wt %, the low temperature sintering property is insufficient as shown in Sample No. 10, and practically difficult. When it exceeds 3.0 wt %, the Q characteristic goes down as shown in Sample No. 12, and also practically difficult.

When the glass amount is less than 2.0 wt %, the low temperature sintering property is insufficient as shown in Sample No. 7, practically difficult. When it exceeds 10 wt %, the Q characteristic goes down as shown in Sample No. 9, and also practically difficult.

From these results, the sintering promotion effect by containing the glass powder and CuO is apparent. If these components are contained in the range set forth in the present invention, the sintering is possible at temperature below the Ag melting point while satisfying the practically sufficient dielectric characteristics.

Example 2

BaCO$_3$, Nd(OH)$_3$ and TiO$_2$ were used as starting materials, weighed such that the mixing ratios of BaO, Nd$_2$O$_3$ and TiO$_2$ after burning were as shown in Table 3, added with pure water to be 30% concentration of a slurry, wet-mixed in a ball mill for 16 hours, and then dried. Subsequently, the dried powder was calcined in the air at temperature of 1250° C. for 2 hours. The calcined powder, the powder of glass kinds B to L in Table 2, and CuO were weighed as shown in Table 2, added with the pure water to be 33% concentration of the slurry, and wet-pulverized in the ball mill for 24 hours, followed by drying to turn out the dielectric powder.

TABLE 3

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | $Nd_2O_3$ | $Sm_2O_3$ | $TiO_2$ | Glass kinds | Glass contents | CuO contents | | Sintered density | $\epsilon$ | Q | TCC | |
| 13 | | 18.5 | 15.4 | 0 | 66.1 | B | 5 | 1 | 920° C. | 5.5 | 86 | 3710 | −39 | Influences of |
| 14 | | 18.5 | 15.4 | 0 | 66.1 | C | 5 | 1 | 920° C. | 5.4 | 82 | 4690 | −56 | glass |
| 15 | | 18.5 | 15.4 | 0 | 66.1 | D | 5 | 1 | 920° C. | 5.4 | 84 | 3250 | −45 | composition |
| 16 | | 18.5 | 15.4 | 0 | 66.1 | E | 5 | 1 | 920° C. | 5.4 | 83 | 3300 | −51 | |
| 17 | | 18.5 | 15.4 | 0 | 66.1 | F | 5 | 1 | 920° C. | 5.4 | 83 | 3400 | −45 | |
| 18 | | 18.5 | 15.4 | 0 | 66.1 | G | 5 | 1 | 920° C. | 5.3 | 74 | 3720 | −15 | |
| 19 | * | 18.5 | 15.4 | 0 | 66.1 | H | 5 | 1 | 920° C. | 4.9 | 68 | 4320 | −11 | |
| 20 | * | 18.5 | 15.4 | 0 | 66.1 | I | 5 | 1 | 920° C. | 4.9 | 77 | 1490 | −34 | |
| 21 | * | 18.5 | 15.4 | 0 | 66.1 | J | 5 | 1 | 920° C. | 4.3 | 75 | 420 | −65 | |
| 22 | * | 18.5 | 15.4 | 0 | 66.1 | K | 5 | 1 | 920° C. | 4.3 | 65 | 1740 | −242 | |
| 23 | * | 18.5 | 15.4 | 0 | 66.1 | L | 5 | 1 | 920° C. | 4.2 | 78 | 930 | −121 | |

To 100 weight parts of the obtained dielectric powder, 6.0 weight part of ethylcellulose as a binder and 90 weight parts of terpineol as a solvent were added, mixed, and dispersed by 3 rollers mill, and the dielectric paste was prepared. The dielectric paste and the Ag paste were alternately laminated by a screen process printing method, and cut into green chips of 4.5 mm×3.2 mm. The green chips were burned in the air for 2 hours, and burned with Ag as the external electrodes so as to make chip capacitors. The sintering property at low temperature was confirmed with the concentration after having been sintered.

The obtained dielectric characteristics are shown in Table 3. The sintered density in Table 3 has a unit of (g/cm$^3$), $\epsilon$ and Q have a unit of dimensionless, and TCC has a unit of (ppm/° C.).

The sintering property is improved by containing the glass powder and CuO in the present invention, and the sintering at temperature below the melting point of Ag (960° C.) is possible.

The glass composition will be referred to. If $SiO_2$ is less than 5 wt %, the vitrification is difficult and not practical. If it exceeds 15 wt %, the low temperature sintering property is not good as Samples Nos. 20 to 23 in Table 2.

When $B_2O_3$ is less than 15 wt %, the sintering property is bad as Samples 20 and 21 of Table 3. If it exceeds 25 wt %, the vitrification is difficult and not practical.

When (MgO+BaO+SrO+ZnO+CaO) is less than 50 wt %, the sintering is not good as Samples Nos. 19 to 23 of Table 3. If it exceeds 80 wt %, $SiO_2$ becomes less than 5 wt % or $B_2O_3$ becomes less than 15 wt %. If $SiO_2$ is less than 5 wt %, the vitrification is difficult. If $B_2O_3$ is less than 15 wt %, the sintering property is inferior. That is, the sintering promotion effect is insufficient.

When ($SiO_2+B_2O_3$+MgO+BaO+SrO+ZnO+CaO) is less than 90 wt %, the sintering is not good as Samples Nos. 19, 21 and 23 of Table 3. When it is up to 100 wt %, the sintering property and Q are satisfied as Samples Nos. 2 to 6, 13 to 18.

From these results, it is seen that the sintering is possible at temperature below the Ag melting point while satisfying the practically sufficient dielectric characteristic by containing the glass powder and Cuo in the range of the invention.

Example 3

$BaCO_3$, Nd(OH)$_3$ and $TiO_2$ were used as starting materials, weighed such that the mixing ratios of BaO, $Nd_2O_3$ and $TiO_2$ after burning were as shown in Table 4, added with pure water to be 30% concentration of a slurry, wet-mixed in a ball mill for 16 hours, and then dried. Subsequently, the dried powder was calcined in the air at temperature of 1250° C. for 2 hours. The calcined powder, the glass powder and CuO were weighed as shown in Table 4, added with the pure water to be 33% concentration of the slurry, and wet-pulverized in the ball mill for 24 hours, followed by drying to turn out the dielectric powder.

TABLE 4

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | $Nd_2O_3$ | $Sm_2O_3$ | $TiO_2$ | Glass kinds | Glass contents | CuO contents | | Sintered density | $\epsilon$ | Q | TCC | |
| 24 | | 9.45 | 24.42 | 0 | 66.13 | A | 5 | 1 | 920° C. | 5.3 | 58.5 | 4970 | 68 | Influences of |
| 25 | | 6.45 | 27.42 | 0 | 66.13 | A | 5 | 1 | 920° C. | 5.1 | 49.2 | 6670 | 124 | main |
| 26 | * | 6.45 | 24.42 | 0 | 69.13 | A | 5 | 1 | 920° C. | 4.4 | 64.9 | 2520 | −255 | component |
| 27 | * | 9.45 | 21.42 | 0 | 69.13 | A | 5 | 1 | 920° C. | 4.6 | 62 | 2380 | −272 | composition |
| 28 | | 12.45 | 21.42 | 0 | 66.13 | A | 5 | 1 | 920° C. | 5.4 | 65 | 4770 | 8 | |
| 29 | * | 12.45 | 24.42 | 0 | 63.13 | A | 5 | 1 | 920° C. | 5.4 | 52 | 340 | 141 | |
| 30 | * | 9.45 | 27.42 | 0 | 63.13 | A | 5 | 1 | 920° C. | 5.3 | 41 | 190 | 268 | |
| 31 | | 14.45 | 19.42 | 0 | 66.13 | A | 5 | 1 | 920° C. | 5.4 | 68.3 | 4310 | 1 | |
| 32 | | 16.45 | 17.42 | 0 | 66.13 | A | 5 | 1 | 920° C. | 5.5 | 74.8 | 3820 | −30 | |
| 33 | | 18.45 | 15.42 | 0 | 66.13 | A | 5 | 1 | 920° C. | 5.4 | 77.9 | 3530 | −58 | |
| 34 | | 16.45 | 18.42 | 0 | 65.13 | A | 5 | 1 | 920° C. | 5.6 | 68.8 | 2830 | 23 | |
| 35 | | 18.45 | 16.42 | 0 | 65.13 | A | 5 | 1 | 920° C. | 5.5 | 81.3 | 3520 | −54 | |

TABLE 4-continued

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | $Nd_2O_3$ | $Sm_2O_3$ | $TiO_2$ | Glass kinds | Glass contents | CuO contents | | Sintered density | $\epsilon$ | Q | TCC | |
| 36 | | 16.45 | 19.42 | 0 | 64.13 | A | 5 | 1 | 920° C. | 5.6 | 65.7 | 2100 | 83 | |
| 37 | | 18.45 | 17.42 | 0 | 64.13 | A | 5 | 1 | 920° C. | 5.5 | 78.1 | 2250 | −12 | |
| 38 | | 20.45 | 15.42 | 0 | 64.13 | A | 5 | 1 | 920° C. | 5.5 | 91 | 2500 | −244 | |
| 39 | | 22.45 | 13.42 | 0 | 64.13 | A | 5 | 1 | 920° C. | 5.5 | 99.7 | 1100 | −191 | |
| 40 | | 21.45 | 13.42 | 0 | 65.13 | A | 5 | 1 | 920° C. | 5.4 | 94.4 | 1620 | −177 | |
| 41 | | 20.45 | 13.42 | 0 | 66.13 | A | 5 | 1 | 920° C. | 5.3 | 81.5 | 2910 | −108 | |
| 42 | | 6.00 | 30.00 | 0 | 64.00 | A | 5 | 1 | 920° C. | 5.7 | 45 | 2000 | 150 | |
| 43 | | 6.00 | 26.00 | 0 | 68.00 | A | 5 | 1 | 920° C. | 5.1 | 53 | 3900 | −100 | |
| 44 | | 12.50 | 19.50 | 0 | 68.00 | A | 5 | 1 | 920° C. | 5.1 | 68 | 3500 | −100 | |
| 45 | | 16.50 | 15.50 | 0 | 68.00 | A | 5 | 1 | 920° C. | 5.2 | 73 | 3500 | −100 | |
| 46 | | 19.00 | 13.00 | 0 | 68.00 | A | 5 | 1 | 920° C. | 5.3 | 79 | 2300 | −150 | |
| 47 | * | 4.00 | 32.00 | 0 | 64.00 | A | 5 | 1 | 920° C. | 4.9 | 41 | 1800 | 175 | |
| 48 | * | 4.00 | 30.00 | 0 | 66.00 | A | 5 | 1 | 920° C. | 4.8 | 45 | 7200 | 145 | |
| 49 | * | 25.45 | 11.42 | 0 | 63.13 | A | 5 | 1 | 920° C. | 5.4 | 128.3 | 480 | −429 | |
| 50 | * | 25.45 | 11.42 | 0 | 64.13 | A | 5 | 1 | 920° C. | 5.3 | 111.9 | 650 | −222 | |
| 51 | * | 23.45 | 11.42 | 0 | 64.13 | A | 5 | 1 | 920° C. | 5.3 | 96.5 | 960 | −184 | |

To 100 weight parts of the obtained dielectric powder, 6.0 weight part of ethylcellulose as a binder and 90 weight parts of terpineol as a solvent were added, mixed, and dispersed by 3 rolls, and the dielectric paste was prepared. The dielectric paste and the Ag paste were alternately laminated by a screen process printing method, and cut into green chips of 4.5 mm×3.2 mm. The green chips were burned in the air for 2 hours, and burned with Ag as the external electrodes so as to make chip capacitors.

The obtained dielectric characteristics are shown in Table 4. The sintered density in Table 4 has a unit of (g/cm³), E and Q have a unit of dimensionless, and TCC has a unit of (ppm/° C.).

From Table 4, it is seen that when the composition of BaO, $Nd_2O_3$ and $TiO_2$ are within the range of the present invention, the dielectric characteristics are practically sufficient.

That is, when BaO is less than 6 mol %, the low temperature sintering property is made superior as Sample No. 47 of Table 4, and the dielectric constant goes down. When it exceeds 23 mol %, Q is small as Samples Nos. 49 to 51 of Table 4.

When $Nd_2O_3$ is less than 13 mol %, Q is small as Samples Nos. 49 to 51 of Table 4. When it exceeds 30 mol %, the sintering property is not good as Sample 47 of Table 4.

When $TiO_2$ is less than 64 mol %, Q is small as Samples Nos. 29 and 30 of Table 4. When it exceeds 68 mol %, the sintering property is not good as Samples Nos. 26 and 27 of Table 4.

Thus, by selecting the composition of the main component as the present invention, it is possible to select the comprehensive dielectric constants from 40 to 80 or more while keeping the small temperature coefficient. Further, the burning at temperature below the Ag melting point as maintaining the predetermined dielectric characteristics is possible.

Example 4

$BaCO_3$, $Nd(OH)_3$ $Sm_2O_3$ and $TiO_2$ were used as starting materials, weighed such that the mixing ratios of BaO, $Nd_2O_3$, $Sm_2O_3$ and $TiO_2$ after burning were as shown in Table 5, added with pure water to be 30% concentration of a slurry, wet-mixed in a ball mill for 16 hours, and then dried. Subsequently, the dried powder was calcined in the air at temperature of 1250° C. for 2 hours. The calcined powder, the glass powder and cuo were weighed as shown in Table 5, added with the pure water to be 33% concentration of the slurry, and wet-pulverized in the ball mill for 24 hours, followed by drying to turn out the dielectric powder.

TABLE 5

| Sample Nos. | Comparative examples | Composition of main component (mol %) | | | | Sub component (wt %) | | | Burning temp. | Electrical properties | | | | Memorandum |
|---|---|---|---|---|---|---|---|---|---|---|---|---|---|---|
| | | BaO | $Nd_2O_3$ | $Sm_2O_3$ | $TiO_2$ | Glass kinds | Glass contents | CuO contents | | Sintered density | $\epsilon$ | Q | TCC | |
| 52 | | 18.5 | 16.5 | 0 | 65 | A | 5 | 1 | 920° C. | 5.5 | 78.1 | 1740 | −25 | Influence of $Sm_2O_3$ substitution |
| 53 | | 18.5 | 14.85 | 1.65 | 65 | A | 5 | 1 | 920° C. | 5.4 | 82.9 | 3660 | −78 | |
| 54 | | 18.5 | 11.55 | 4.95 | 65 | A | 5 | 1 | 920° C. | 5.5 | 80.4 | 3460 | −1 | |
| 55 | | 18.5 | 8.25 | 8.25 | 65 | A | 5 | 1 | 920° C. | 5.7 | 76.8 | 3270 | 20 | |
| 56 | | 18.5 | 4.95 | 11.55 | 65 | A | 5 | 1 | 920° C. | 5.7 | 82.2 | 1710 | 8 | |
| 57 | | 18.5 | 0.01 | 16.49 | 65 | A | 5 | 1 | 920° C. | 5.8 | 82.6 | 1370 | 74 | |
| 58 | | 18.5 | 8.25 | 8.25 | 65 | B | 5 | 1 | 920° C. | 5.7 | 77 | 2900 | 23 | |
| 59 | | 18.5 | 8.25 | 8.25 | 65 | C | 5 | 1 | 920° C. | 5.7 | 75.5 | 3420 | 19 | |

TABLE 5-continued

| | | Composition of main component (mol %) | | | | Sub component (wt %) | | | Electrical properties | | | | |
|---|---|---|---|---|---|---|---|---|---|---|---|---|---|
| Sample Nos. | Comparative examples | BaO | $Nd_2O_3$ | $Sm_2O_3$ | $TiO_2$ | Glass kinds | Glass contents | CuO contents | Burning temp. | Sintered density | $\epsilon$ | Q | TCC | Memorandum |
| 60 | | 18.5 | 8.25 | 8.25 | 65 | D | 5 | 1 | 920° C. | 5.7 | 78 | 2650 | 22 | |
| 61 | * | 18.5 | 8.25 | 8.25 | 65 | K | 5 | 1 | 920° C. | 4.3 | 69.2 | 1540 | −10 | |
| 62 | * | 18.5 | 8.25 | 8.25 | 65 | L | 5 | 1 | 920° C. | 4.2 | 72.1 | 920 | −13 | |

To 100 weight parts of the obtained dielectric powder, 6.0 weight part of ethylcellulose as a binder and 90 weight parts of terpineol as a solvent were added, mixed, and dispersed by 3 rollers mill, and the dielectric paste was prepared. The dielectric paste and the Ag paste were alternately laminated by a screen process printing method, and cut into green chips of 4.5 mm×3.2 mm. The green chips were burned in the air for 2 hours, and burned with Ag as the external electrodes so as to make chip capacitors.

The obtained dielectric characteristics are shown in Table 3. The sintered density in Table 5 has a unit of (g/cm³), $\epsilon$ and Q have a unit of dimensionless, and TCC has a unit of (ppm/° C.).

As apparent from Samples Nos. 52 to 57 of Table 5, it is seen that also when $Sm_2O_3$ as the rare earth is substituted for $Nd_2O_3$ in the main component, the sintering below the Ag melting point is possible while maintaining the practically sufficient dielectric constant. Further, by the substitution of $Sm_2O_3$, the temperature coefficient can be set at optional values. When the substitution is made by $Sm_2O_3$, according to the glass composition of the invention, the low temperature sintering is possible while maintaining the practically sufficient dielectric characteristics as Samples Nos. 58 to 60 of Table 5. However, as shown in Samples Nos. 61 and 62 of Table 5, according to the glass composition out of the invention, the low temperature sintering is not good.

There are many reports of the low temperature sintering of the microwave dielectrics of BaO—rare earth oxides—$TiO_2$ group. Differences between the present invention and the conventional art will be described.

In JP-A-3-295856, JP-A-5-97508, JP-A-5-319921, JP-A-5-319922, JP-A-6-116021, JP-A-6-116022, JP-A-8-167324, and JP-A-8-245262, since one or both of PbO and $Bi_2O_3$ are contained in the main component, the difference from the invention is apparent. In JP-A-5-97508, JP-A-5-234420, JP-A-6-211564, JP-A-6-223625, JP-A-8-167322, JP-A-8-167323, JP-A-8-167324, JP-A-8-208328 and JP-A-8-208329, since one or both of PbO and $Bi_2O_3$ are added to the glass composition or the sub component to be added to the main component, the difference from the invention is apparent. In JP-A-5-319920, JP-A-5-319921, JP-A-6-116021 and JP-A-6-116022, there are all or parts of claims containing neither of PbO nor $Bi_2O_3$, but CuO is indispensable in the present invention for promoting the sintering, and the inclusion of CuO is apparently recognized in the low temperature sintering promotion effect, and from this fact the present invention is different from the known technologies not including CuO.

According to the invention, it is possible to provide the dielectric porcelain composition enabling to burn at temperature below the melting point of Ag, Cu or an alloy of Ag or Cu, while maintaining the dielectric characteristics to the utmost by including CuO and the glass element to the dielectric porcelain of $BaO·Nd_2O_3·TiO_2$ group. Accordingly, it is possible to compose electronic parts where these metals are internal conductors, resulting in improving, miniaturizing and making low costs of various characteristics of the devices for high frequency. In particular, the present invention makes use of CuO in addition to the glass element practiced conventionally. By containing CuO, it is possible to reduce the glass amount than conventionally, thus contributing to the low costs in addition to the improvement of the dielectric characteristic.

Furthermore, since the composition according to the present invention does not include any environmental contaminating substances such as PbO, $Bi_2O_3$ and the like, the devices suited to parts of the recent environment protection may be provided, and any especial equipment for treating waste liquids is not required, thereby making for the low cost. PbO and $Bi_2O_3$ are easily evaporated at high temperature, and as the present invention does not contain these evaporating substances, it is possible to provide the dielectric porcelain composition effective in removing instability in the manufacturing process.

What is claimed is:

1. A dielectric porcelain composition comprising:
   a main component expressed in a general formula of $xBaO·y((1-t)Nd_2O_3·tSm_2O_3)·zTiO_2$;

where $6 \leq x \leq 23$, $13 \leq y \leq 30$, $64 \leq z \leq 68$, $0 \leq t < 1$ and $x+y+z=100$;
   said main component containing a sub component comprising Cu oxide in the range of 0.1 to 3.0 wt % in terms of CuO and glass composition in the range of 2.0 to 10 wt %;
   wherein 90 wt % or more of said glass composition is at least one selected from $SiO_2$, $B_2O_3$, MgO, BaO, SrO, ZnO and CaO, and said glass composition satisfies the conditions of: 5 wt % $\leq SiO_2 \leq$ 15 wt %; 15 wt % $\leq B_2O_3 \leq$ 25 wt %; 50 wt % $\leq$ (MgO+BaO+SrO+ZnO+CaO) $\leq$ 80 wt %; 90 wt % $\leq$ ($SiO_2+B_2O_3$+MgO+BaO+SrO+ZnO+CaO) $\leq$ 100 wt %.

2. The dielectric porcelain composition according to claim 1, wherein a density of the sintered body after having been burned at 920° C. is 5.0 g/cm³ or more.

3. The dielectric porcelain composition according to claim 1, wherein Q characteristic is 1000 or more.

* * * * *